(12) United States Patent
Fang

(10) Patent No.: US 6,839,874 B1
(45) Date of Patent: Jan. 4, 2005

(54) METHOD AND APPARATUS FOR TESTING AN EMBEDDED DEVICE

(75) Inventor: Ying Fang, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 498 days.

(21) Appl. No.: 10/086,130

(22) Filed: Feb. 28, 2002

(51) Int. Cl.⁷ ................................................ G06F 11/00
(52) U.S. Cl. ..................... 714/738; 714/30; 714/724; 714/725
(58) Field of Search .................. 714/738, 724, 714/725, 30, 47, 48, 734, 733

(56) References Cited

U.S. PATENT DOCUMENTS

| | | |
|---|---|---|
| 4,758,985 A | 7/1988 | Carter |
| 4,855,669 A | 8/1989 | Mahoney |
| 5,072,418 A | 12/1991 | Boutaud et al. |
| 5,142,625 A | 8/1992 | Nakai |
| RE34,363 E | 8/1993 | Freeman |
| 5,274,570 A | 12/1993 | Izumi et al. |
| 5,311,114 A | 5/1994 | Sambamurthy et al. |
| 5,339,262 A | 8/1994 | Rostoker et al. |
| 5,347,181 A | 9/1994 | Ashby et al. |
| 5,361,373 A | 11/1994 | Gilson |
| 5,457,410 A | 10/1995 | Ting |
| 5,473,267 A | 12/1995 | Stansfield |
| 5,500,943 A | 3/1996 | Ho et al. |
| 5,504,738 A | 4/1996 | Sambamurthy et al. |
| 5,537,601 A | 7/1996 | Kimura et al. |
| 5,543,640 A | 8/1996 | Sutherland et al. |
| 5,550,782 A | 8/1996 | Cliff et al. |
| 5,553,082 A * | 9/1996 | Connor et al. ............... 714/733 |
| 5,574,930 A | 11/1996 | Halverson, Jr. et al. |
| 5,574,942 A | 11/1996 | Colwell et al. |
| 5,581,745 A | 12/1996 | Muraoka |
| 5,600,845 A | 2/1997 | Gilson |
| 5,652,904 A | 7/1997 | Trimberger |
| 5,671,355 A | 9/1997 | Collins |
| 5,705,938 A | 1/1998 | Kean |
| 5,732,250 A | 3/1998 | Bates et al. |
| 5,737,631 A | 4/1998 | Trimberger |
| 5,740,404 A | 4/1998 | Baji |
| 5,742,179 A | 4/1998 | Sasaki |
| 5,742,180 A | 4/1998 | DeHon et al. |

(List continued on next page.)

FOREIGN PATENT DOCUMENTS

| | | |
|---|---|---|
| EP | 0315275 A2 | 10/1989 |
| EP | 0 905 906 A2 | 3/1999 |
| EP | 1 235 351 A1 | 8/2002 |
| WO | WO 93 25968 A1 | 12/1993 |

OTHER PUBLICATIONS

U.S. patent application Ser. No. 10/043,769, Schulz, filed Jan. 9, 2002.

(List continued on next page.)

*Primary Examiner*—Phung M. Chung
(74) *Attorney, Agent, or Firm*—H. C. Chan

(57) ABSTRACT

Method and apparatus for testing a device embedded in a programmable logic device is described. Because an embedded device, such as a microprocessor core, comprises more input and output pins than a programmable logic device, such as a field programmable gate array, in which it is located, providing a test vector wider than the number of external input and output pins of the programmable logic device is problematic. To solve this problem, at least a portion of the programmable logic device is programmed to function as a vector controller, where a test vector may be provided to the vector controller in sections, reassembled by the vector controller and provided to the embedded device after reassembly. Moreover, a test vector result in response to the test vector input is obtained by the vector controller and sectioned for outputting.

20 Claims, 6 Drawing Sheets

U.S. PATENT DOCUMENTS

| | | | |
|---|---|---|---|
| 5,748,979 A | | 5/1998 | Trimberger |
| 5,752,035 A | | 5/1998 | Trimberger |
| 5,760,607 A | | 6/1998 | Leeds et al. |
| 5,809,517 A | | 9/1998 | Shimura |
| 5,835,405 A | | 11/1998 | Tsui et al. |
| 5,859,804 A | * | 1/1999 | Hedberg et al. ............ 365/201 |
| 5,874,834 A | | 2/1999 | New |
| 5,889,788 A | | 3/1999 | Pressly et al. |
| 5,892,961 A | | 4/1999 | Trimberger |
| 5,914,616 A | | 6/1999 | Young et al. |
| 5,914,902 A | | 6/1999 | Lawrence et al. |
| 5,933,023 A | | 8/1999 | Young |
| 5,970,254 A | | 10/1999 | Cooke et al. |
| 6,011,407 A | | 1/2000 | New |
| 6,020,755 A | | 2/2000 | Andrews et al. |
| 6,026,481 A | * | 2/2000 | New et al. ..................... 712/43 |
| 6,096,091 A | | 8/2000 | Hartmann |
| 6,154,051 A | | 11/2000 | Nguyen et al. |
| 6,163,166 A | | 12/2000 | Bielby et al. |
| 6,172,990 B1 | | 1/2001 | Deb et al. |
| 6,178,541 B1 | | 1/2001 | Joly et al. |
| 6,181,163 B1 | | 1/2001 | Agrawal et al. |
| 6,211,697 B1 | | 4/2001 | Lien et al. |
| 6,242,945 B1 | | 6/2001 | New |
| 6,272,451 B1 | | 8/2001 | Mason et al. |
| 6,279,045 B1 | | 8/2001 | Muthujumaraswathy et al. |
| 6,282,627 B1 | | 8/2001 | Wong et al. |
| 6,301,696 B1 | | 10/2001 | Lien et al. |
| 6,343,207 B1 | | 1/2002 | Hessel et al. |
| 6,353,331 B1 | | 3/2002 | Shimanek |
| 6,356,987 B1 | | 3/2002 | Aulas |
| 6,389,558 B1 | | 5/2002 | Herrmann et al. |
| 6,434,735 B1 | | 8/2002 | Watkins |
| 6,460,172 B1 | | 10/2002 | Insenser Farre et al. |
| 6,467,009 B1 | | 10/2002 | Winegarden et al. |
| 6,483,342 B2 | | 11/2002 | Britton et al. |
| 6,507,942 B1 | | 1/2003 | Calderone et al. |
| 6,510,548 B1 | | 1/2003 | Squires |
| 6,518,787 B1 | | 2/2003 | Allegrucci et al. |
| 6,519,753 B1 | | 2/2003 | Ang |
| 6,522,167 B1 | | 2/2003 | Ansari et al. |
| 6,532,572 B1 | | 3/2003 | Tetelbaum |
| 6,539,508 B1 | | 3/2003 | Patrie et al. |
| 6,541,991 B1 | | 4/2003 | Hornchek et al. |
| 6,578,174 B2 | | 6/2003 | Zizzo |
| 6,587,995 B1 | | 7/2003 | Duboc et al. |
| 6,588,006 B1 | | 7/2003 | Watkins |
| 6,601,227 B1 | | 7/2003 | Trimberger |
| 6,604,228 B1 | | 8/2003 | Patel et al. |
| 6,611,951 B1 | | 8/2003 | Tetelbaum et al. |
| 6,751,762 B2 | * | 6/2004 | Antonischki ................ 714/718 |
| 2001/0049813 A1 | | 12/2001 | Chan et al. |
| 2003/0062922 A1 | | 4/2003 | Douglass et al. |

OTHER PUBLICATIONS

Sayfe Kiaei et al., "VLSI Design of Dynamically Reconfigurable Array Processor–Drap," IEEE, Feb. 1989, pp. 2484–2488, V3.6, IEEE, 3 Park Avenue, 17th Floor, New York, NY 10016–5997.

Vason P. Srini, "Field Programmable Gate Array (FPGA) Implementation of Digital Systems: An Alternative to ASIC," IEEE, May 1991, pp. 309–314, IEEE, 3 Park Avenue, 17th Floor, New York, NY 10016–5997.

G. Maki et al., "A Reconfigurable Data Path Processor," IEEE, Aug. 1991, pp. 18–4.1 to 18–4.4, IEEE, 3 Park Avenue, 17th Floor, New York, NY 10016–5997.

Jacob Davidson, "FPGA Implementation of Reconfigurable Microprocessor," IEEE, Mar. 1993, pp. 3.2.1–3.2.4, IEEE, 3 Park Avenue, 17th Floor, New York, NY 10016–5997.

Christian Iseli et al., "Beyond Superscaler Using FPGA's," IEEE, Apr. 1993, pp. 486–490, IEEE, 3 Park Avenue, 17th Floor, New York, NY 10016–5997.

P.C. French et al., "A Self–Reconfiguring Processor,"; IEEE, Jul. 1993, pp. 50–59, IEEE, 3 Park Avenue, 17th Floor, New York, NY 10016–5997.

Christian Iseli et al., "Spyder: A Reconfigurable VLIW Processor Using FPGA's," IEEE, Jul. 1993, pp. 17–24, IEEE, 3 Park Avenue, 17th Floor, New York, NY 10016–5997.

Michael J. Wirthlin et al., "The Nano Processor: A Low Resource Reconfigurable Processor," IEEE, Feb. 1994, pp. 23–30, IEEE, 3 Park Avenue, 17th Floor, New York, NY 10016–5997.

William S. Carter, "The Future of Programmable Logic and Its Impact on Digital System Design," Apr. 1994, IEEE, pp. 10–16, IEEE, 3 Park Avenue, 17th Floor, New York, NY 10016–5997.

Andre' Dehon, "DPGA–Coupled Microprocessors: Commodity ICs For the Early 21st Century,"IEEE, Feb. 1994, pp. 31–39, IEEE, 3 Park Avenue, 17th Floor, New York, NY 10016–5997.

Osama T. Albaharna, "Area & Time Limitations of FPGA–Based Virtual Hardware," IEEE, Apr. 1994, pp. 184–189, IEEE, 3 Park Avenue, 17th Floor, New York, NY 10016–5997.

Xilinx, Inc., "The Programmable Logic Data Book," 1994, Revised 1995, Xilinx, Inc., 2100 Logic Drive, San Jose, CA. 95124.

Xilinx, Inc., "The Programmable Logic Data Book," 1994, Revised 1995, pp 2–109 to 2–117, Xilinx, Inc., 2100 Logic Drive, San Jose, CA. 95124.

Xilinx, Inc., "The Programmable Logic Data Book," 1994, Revised 1995, pp 2–9 to 2–18; 2–187 to 2–199, Xilinx, Inc., 2100 Logic Drive, San Jose, CA. 95124.

Xilinx, Inc., "The Programmable Logic Data Book," 1994, Revised 1995, pp 2–107 to 2–108, Xilinx, Inc., 2100 Logic Drive, San Jose, CA. 95124.

Christian Iseli et al., "AC++ Compiler for FPGA Custom Execution Units Synthesis," 1995, pp. 173–179, IEEE, 3 Park Avenue, 17th Floor, New York, NY 10016–5997.

International Business Machines, "POWERPC 405 Embedded Processor Core User Manual," 1996, 5TH Ed., pp. 1–1 to X–16, International Business Machines, 1580 Rout 52, Bldg. 504, Hopewell Junction, NY 12533–6531.

Yamin Li et al., "AIZUP—A Pipelined Processor Design & Implementation on Xilinx FPGA Chip," IEEE, Sep. 1996, pp 98–106, 98–106, IEEE, 3 Park Avenue, 17th Floor, New York, NY 10016–5997.

Ralph D. Wittig et al., ONECHIP: An FPGA Processor With Reconfigurable Logic, Apr. 17, 1996, pp 126–135, IEEE, 3 Park Avenue, 17th Floor, New York, NY 10016–5997.

Xilinx, Inc., "The Programmable Logic Data Book," Jan. 27, 1999, Ch. 3, pp 3–1 to 3–50, Xilinx, Inc., 2100 Logid Drive, San Jose, CA 95124.

William B. Andrew et al., "A Field Programmable System Chip Which Combines FPGA & ASIC Circuitry," IEEE, May 16, 1999, pp. 183–186, IEEE, 3 Park Avenue, 17th Floor, New York, NY 10016–5997.

Xilinx, Inc., "The Programmable Logic Data Book," 2000, Ch. 3 pp 3–1 to 3–117, Xilinx, Inc., 2100 Logic Drive, San Jose, CA 95124.

U.S. patent application Ser. No. 10/001,871, Douglass et al., filed Nov. 19, 2001.

U.S. patent application Ser. No. 09/991,412, Herron et al., filed Nov. 16, 2001.

U.S. patent application Ser. No. 09/991,410, Herron et al., filed Nov. 16, 2001.

U.S. patent application Ser. No. 09/968,446, Douglass et al., filed Sep. 28, 2001.

Xilinx, Inc., "The Programmable Logic Data Book," 2000, Ch 3, pp 3–7 to 3–17; 3–76 to 3–87, Xilinx, Inc., 2100 Logic Drive, San Jose, CA 95124.

International Business Machines, "Processor Local Bus"Architecture Specifications, 32–Bit Implementation, Apr. 2000, First Edition, V2.9, pp. 1–76, IBM Corporation, Department H83A, P.O. Box 12195, Research Triangle Park, NC 27709.

Xilinx, Inc., Virtex II Platform FPGA Handbook, Dec. 6, 2000, v1.1, pp 33–75, Xilinx, Inc., 2100 Logic Drive, San Jose, CA. 95124.

U.S. patent application Ser. No. 09/858,732, Schulz, filed May 15, 2001.

U.S. patent application Ser. No. 09/861,112, Dao et al., filed May 18, 2001.

U.S. patent application Ser. No. 09/917,304, Douglass et al., filed Jul. 27, 2001.

Cary D. Snyder and Max Baron; "Xilinx's A–to–Z System Platform"; Cahners Microprocessor; The Insider's Guide to Microprocessor Hardware; Microdesign Resources; Feb. 6, 2001; pp. 1–5.

* cited by examiner

METHOD AND APPARATUS FOR TESTING AN EMBEDDED DEVICE

FIELD OF THE INVENTION

The present invention relates generally to testing an embedded device, and more particularly to testing a device embedded in a programmable logic device.

BACKGROUND OF THE INVENTION

Programmable logic devices exist as a well-known type of integrated circuits that may be programmed by a user to perform specified logic functions. There are different types of programmable logic devices, such as programmable logic arrays (PLAs) and complex programmable logic devices (CPLDs). One type of programmable logic devices, called a field programmable gate array (FPGA), is very popular because of a superior combination of capacity, flexibility and cost.

An FPGA typically includes an array of configurable logic blocks (CLBs) surrounded by a ring of programmable input/output blocks (IOBs). The CLBs and IOBs are interconnected by a programmable interconnect structure. The CLBs, IOBs, and interconnect structure are typically programmed by loading a stream of configuration data (bitstream) into internal configuration memory cells that define how the CLBs, IOBs, and interconnect structure, are configured. The configuration bitstream may be read from an external memory, conventionally an external integrated circuit memory EEPROM, EPROM, PROM, and the like, though other types of memory may be used. The collective states of the individual memory cells then determine the function of the FPGA.

An FPGA or other integrated circuit is conventionally tested by connecting it to a socket coupled to probe printed circuit board (PCB) or card, prototype card or other testing or tester card. Externally accessible input and output pins of such an integrated circuit are coupled to a printed circuit board for coupling to a tester.

However, an embedded device may not have directly accessible external pins after it is embedded. For example, a wafer having a plurality of microprocessor cores formed on it may be subsequently processed to form respective FPGAs in contact with such a microprocessor core. The microprocessor core may no longer be directly accessible owing to interconnect layers and dielectric layers, among others, extending over the microprocessor core.

This presents a problem for testing the microprocessor core. Even if a microprocessor core were tested prior to FPGA fabrication, it would still need to be retested after such FPGA fabrication. To test such a microprocessor core, input and output pins of the combined FPGA and microprocessor core device need to be used to access internal pins of the microprocessor core device. However, the microprocessor core device may comprise more inputs and outputs than the device in which it is embedded. Moreover, extending inputs and outputs of the microprocessor core device to provide additional inputs and outputs of the combined device would necessitate significant additional interconnect routing and an increase in package size.

Accordingly, it would be desirable and useful to provide method and apparatus for testing an embedded device without increased package size. Moreover, it would be desirable and useful to provide method and apparatus to test an embedded device without additional circuitry even though an integrated circuit manufactured with such an embedded device has fewer input and output pins than the embedded device.

SUMMARY OF THE INVENTION

An aspect of the present invention is a method for testing an embedded device in an integrated circuit. More particularly, the integrated circuit has a first plurality of pins, and the embedded device has a second plurality of pins, where the second plurality of pins is greater than the first plurality of pins. A portion of the integrated circuit, not the embedded device, is programmed as a vector controller. A test vector is obtained and divided into partial test vectors. Each of the partial test vectors is separately sent to the vector controller, where the partial test vectors are reassembled as the test vector. The test vector is then sent from the vector controller to the embedded device.

Another aspect of the present invention is a system for testing comprising a tester. An integrated circuit to be tested is coupled to the tester, where the integrated circuit comprises a programmable logic device and an embedded device. The embedded device has more input pins than the integrated circuit. The programmable logic device is programmed to receive portions of a test vector and assemble the portions of the test vector to test the embedded device.

Another aspect of the present invention is a method of providing testing capability for an integrated circuit having fewer pins than an embedded device in the integrated circuit. More particularly, a programmable logic device coupled to the embedded device is provided. The programmable logic device forms a portion of the integrated circuit. The programmable logic device is programmed to function as a vector controller, where the vector controller is configured to obtain portions of a test vector, to assemble the portions into the test vector, to provide the test vector as assembled to the embedded device, to obtain a test vector result in response to the test vector as assembled, to disassemble the test vector result into test vector result portions and to output the test vector result portions.

Another aspect of the present invention is an integrated circuit apparatus for providing testing capability for an embedded device in a programmable logic device where the embedded device has more input and output pins than the programmable logic device. At least a portion of the programmable logic device is configured to function as a vector controller, where the vector controller is configured to receive test vector portions, assemble the test vector portions to provide a test vector input to the embedded device, obtain a test vector result from the embedded device in response to the test vector input, and output the test vector result.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

DETAILED DESCRIPTION OF THE DRAWINGS

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
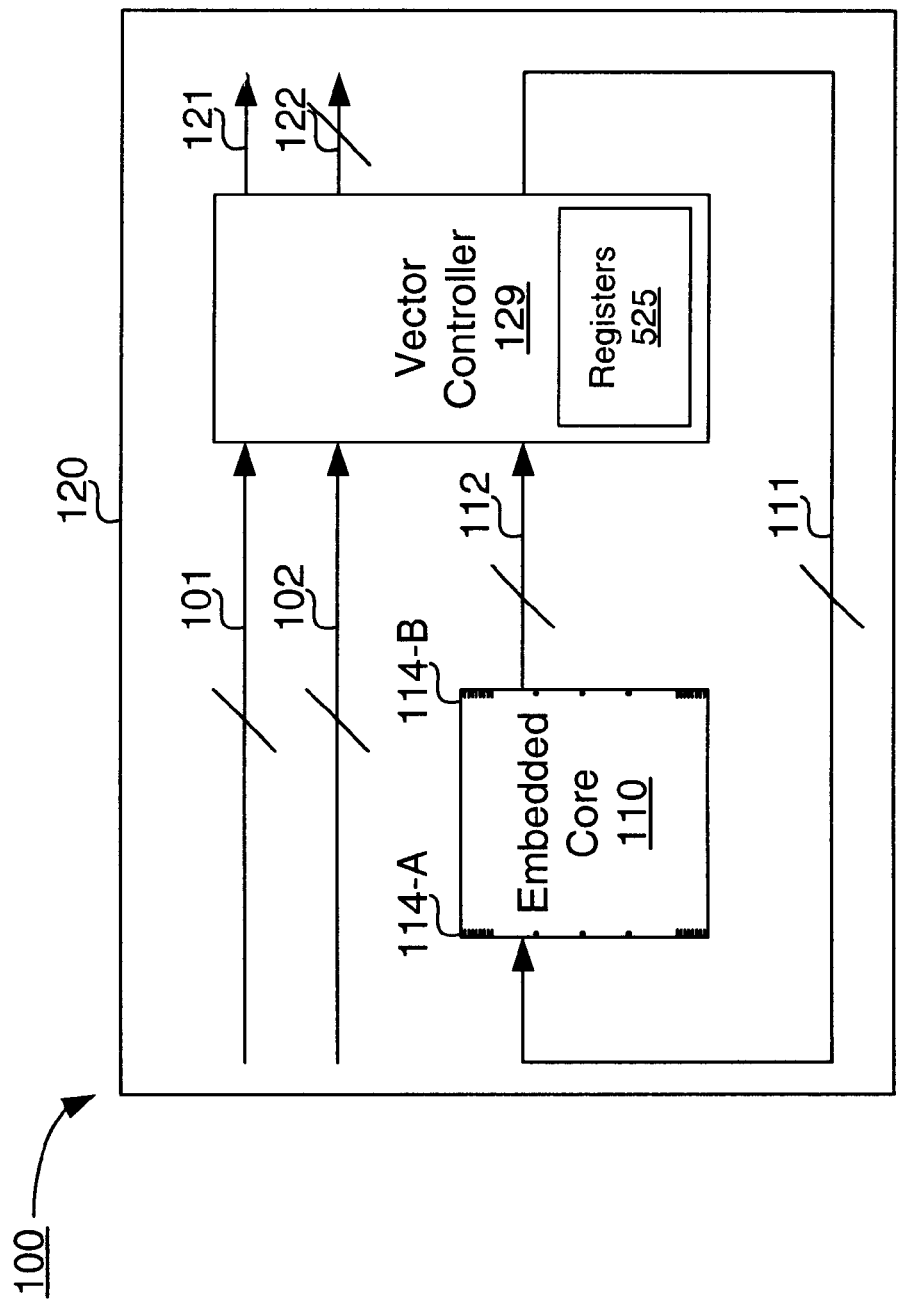
FIG. 1 is a block diagram of an exemplary embodiment of a portion of an integrated circuit comprising an FPGA and an embedded microprocessor core in accordance with one or more aspects of the present invention.
Figure 2:
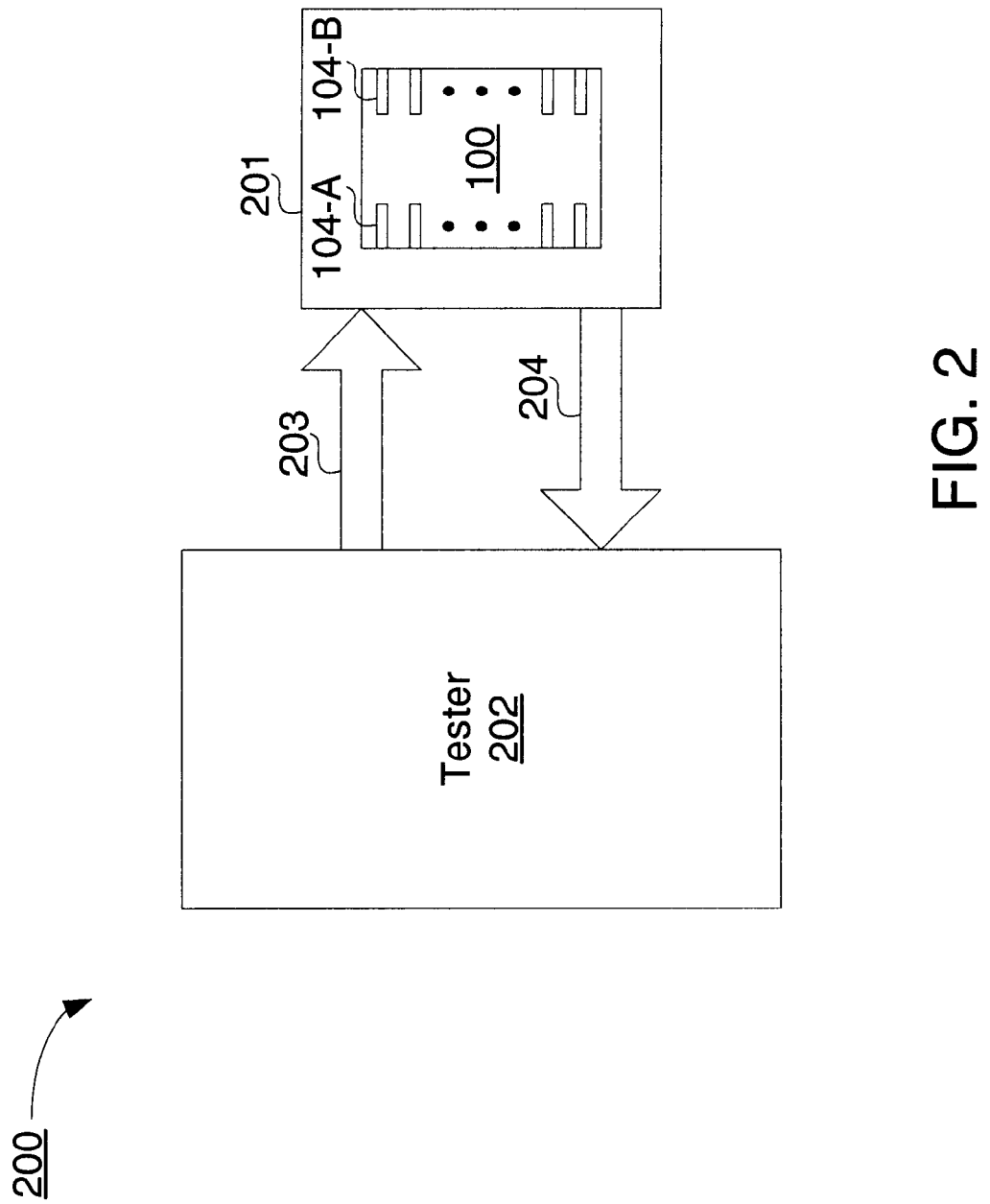
FIG. 2 is a block diagram of an exemplary embodiment of a test system in accordance with one or more aspects of the present invention.

Referring to FIG. 1, there is shown a block diagram of an exemplary embodiment of a portion of an integrated circuit 100 comprising an FPGA 120 and an embedded microprocessor core 110 in accordance with one or more aspects of the present invention. Referring to FIG. 2, there is shown a block diagram of an exemplary embodiment of a test system 200 in accordance with one or more aspects of the present invention. With reference to FIGS. 1 and 2, conventionally a core, such as microprocessor core 110, is provided with test data vectors for testing such a core. These test data vectors may be programmed into a tester 202 for providing input test data vectors to integrated circuit 100 coupled via a printed circuit board 201. Conventionally tester 202 is a programmed computer having a motherboard. A daughter card, such as a "prototyping board" or "demonstration board," having a socket for receiving an integrated circuit 100 is plugged into a bus on the motherboard. A commercially available example of such a system is an AFX Silicon Verification System from Xilinx of San Jose, Calif. Alternatively, automatic test equipment may be used.

Integrated circuit 100 comprises a plurality of input and/or output pins (I/O pins) 104 for connecting to traces or conductive lines on printed circuit board 201 Notably, though system 200 is described in terms of conventional electrically conductive traces, it should be understood that the present invention is not so limited; rather, other forms of connectivity may be used, including, but not limited to, optical, radio wave, and like forms of interconnection.

I/O pins 104 are less in number than I/O pins 114 of embedded core 110. For purposes of clarity and not limitation, assume integrated circuit has 100 input pins and 100 output pins, and assume embedded core 110 has 400 input pins and 400 output pins. A test data vector 203 only 100 bits wide will not induce correct toggling of embedded core 110 for testing purposes. Assuming 400 inputs must be provided to embedded core 110 for correct toggling for testing purposes, such a test data vector is broken up into parts. Continuing the above example, 4 sets of 100 inputs each may be provided from tester 202 as partial test data vectors 203. Again it should be understood that the number of externally accessible inputs of an integrated circuit is less than the number of internally accessible inputs of an embedded core. Additionally, though certain numerical examples have been used for purposes of clarity, it should be apparent that other values may be used depending on actual numbers of input and/or output pins. Moreover, there may be unequal numbers of input and/or output pins, and the number of input and/or output pins need not be equally divisible.

Prior to providing test data partial-vectors 203 to integrated circuit 100 for testing embedded core 110, FPGA 120, or more particularly a portion of FPGA 120, is programmed to provide vector controller 129. By programming FPGA 120 to provide vector controller 129, no additional circuitry is added for testing, rather existing programmable circuitry is used. Furthermore, FPGA 120 comprises sufficient connectivity or data width to and from embedded core 110 for purposes of testing. In other words, FPGA 120 may be interconnected to microprocessor core 110 via input conductive paths 111 and output conductive paths 112, where the number of conductive paths 111 is equal to the number of input pins 114-A used, and the number of conductive paths 112 is equal to the number of output pins 114-B used.

Figure 3:
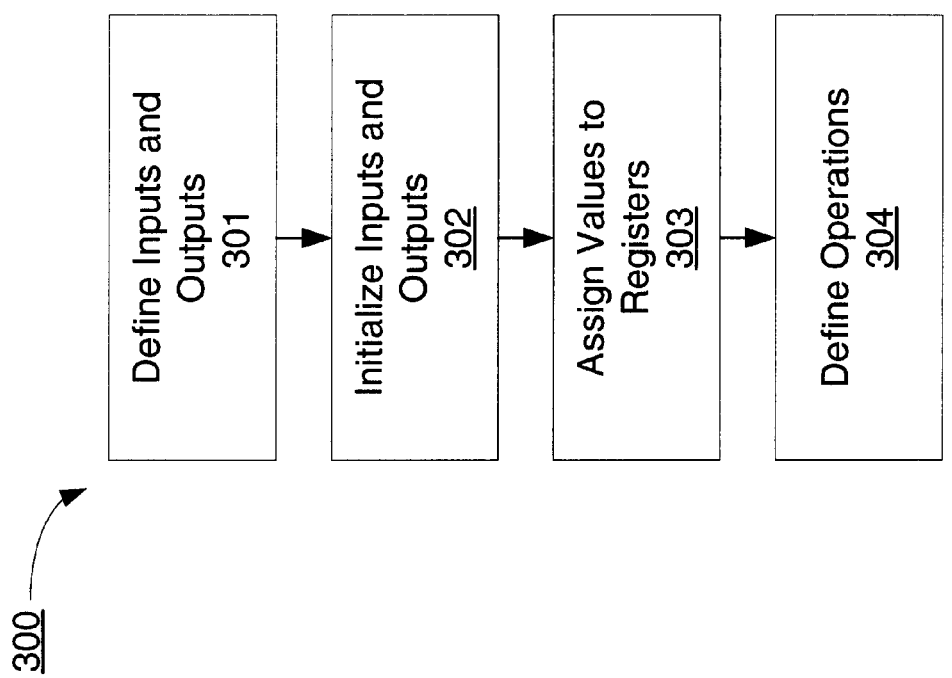
FIG. 3 is a process flow diagram of an exemplary embodiment of a program process for programming FPGA to provide a vector controller in accordance with one or more aspects of the present invention.

Referring to FIG. 3, there is shown a process flow diagram of an exemplary embodiment of a program process 300 for programming FPGA 120 to provide vector controller 129 in accordance with one or more aspects of the present invention. With continuing reference to FIG. 3 and renewed reference to FIGS. 1 and 2, program process 300 is described.

At step 301, inputs and outputs of vector controller 129 are defined, including inputs and outputs from step 301, as well as applicable data widths. Assuming that 100 external inputs 104-A are available for external data input, then data_in 102 may be 100 bits wide ([99:0]). Notably, not all external pins are available for data, as source voltage, ground and control signals are provided to integrated circuit 100. Assuming that embedded core 110 comprises 400 input pins 114-A, then output to embedded core 110 from vector controller 129 may be 400 bits wide ([399:0]) for signal outputs 111. Assuming that embedded core 110 comprises 500 output pins 114-B, then input from embedded core 110 to vector controller 129 may be 500 bits wide ([499:0]) for signal inputs 112. Again, these are merely examples of numbers of inputs and outputs, which numbers can and do vary depending on implementation.

At step 302, control inputs 101, data inputs 102 and inputs 112 from embedded core 110 for vector controller 129 are initialized, and outputs 111 to embedded core 110, control output 121 and data outputs 122 for vector controller 129 are initialized. Notably, during initialization, a signal may be set to 0, 1 or don't care. Inputs to vector controller 129 include, but are not limited to, reset, input-clock (CLK), data_in, input_from_core, and new_vector. Outputs from vector controller 129 include, but are not limited to, output_to_core, data_out, data_ready and output_clock (PCLK). Particularly, output_clock (PCLK) is provided to a clock pin of input pins 114-A of embedded core 110 of FIG. 1 and a bit in a test vector supplied via signal outputs 111 of FIG. 1 for such an output_clock is left unused. Notably, an output_clock signal (PCLK) need not be provided as a separate signal when a test vector is generated so that input signals are applied according to each signal's corresponding digit, in which embodiment, an output_clock signal as part of signals 111 in FIG. 1 is fed to a clock pin of input pins 114-A of embedded core 110 of FIG. 1.

At step 303, registers for vector controller 129 are assigned. Registers may be used to receive and temporarily store respective partial test vector input from data_in and output for data_out. One or more cycle registers may be used to count input and output test vector information, such as partial test vectors and partial test vector results. Notably, as connectivity exists between vector controller 129 and embedded core 110, once FPGA 120 is configured, then there may be lingering signal or invalid data on metal lines interconnecting embedded core 110 and vector controller 129. Accordingly, it is important to delineate between valid data and such invalid data. Thus, vector controller 129 may be programmed with a state machine to make use of registers to determine: when valid assembled data is to be sent from vector controller 129 to embedded core 110, when valid core response data is to be sampled from embedded core 110 to vector controller 129, and when valid control output 121 and valid data output 122 is to be sent from vector controller 129 to tester 202.

At step 304, operations of vector controller 129 are defined. Operations of vector controller 129 are described in more detail below.

Figure 4:
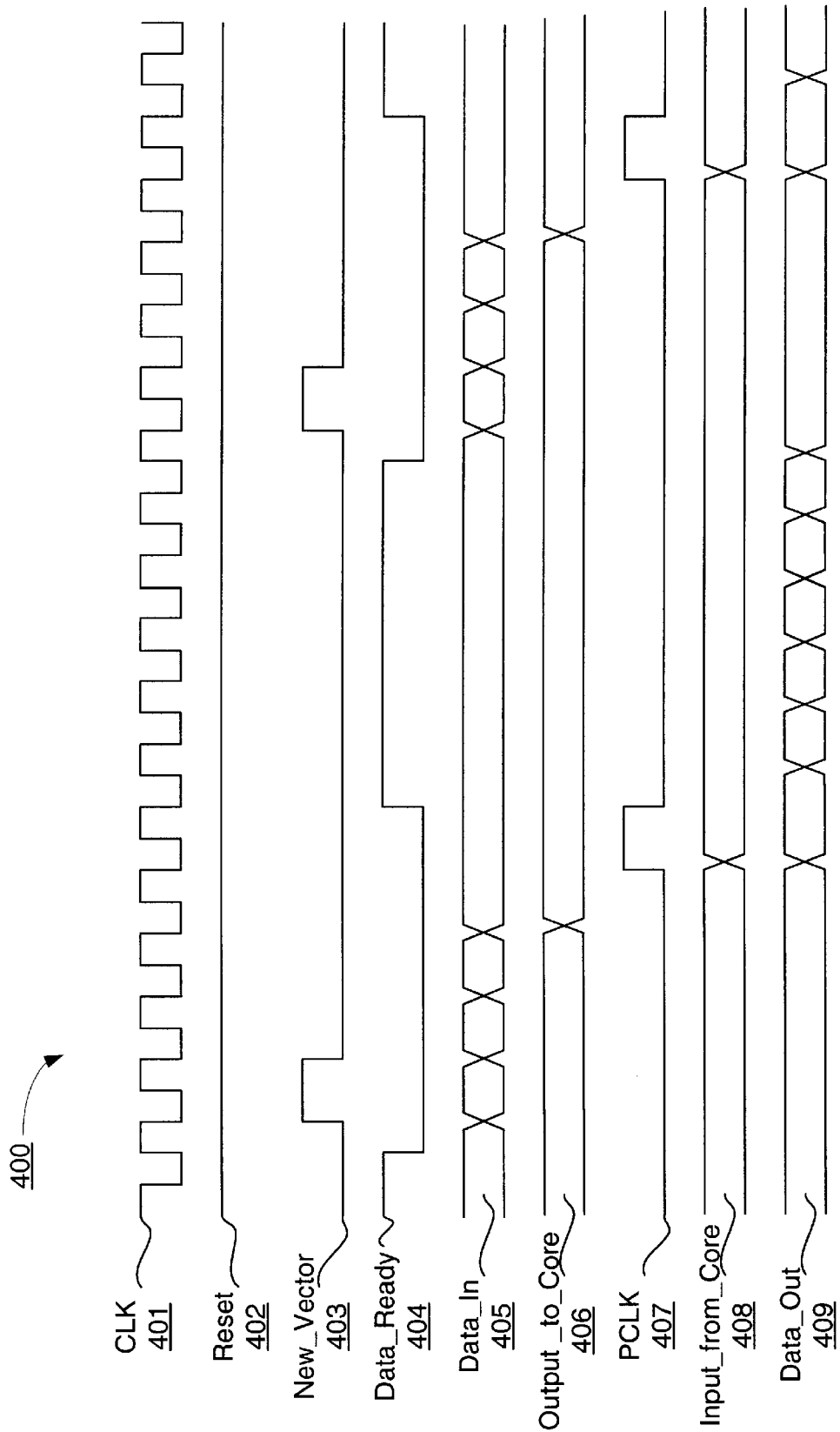
FIG. 4 is a timing diagram of portions of exemplary embodiments of input and output signals of a vector controller in accordance with one or more aspects of the present invention.
Figure 5:
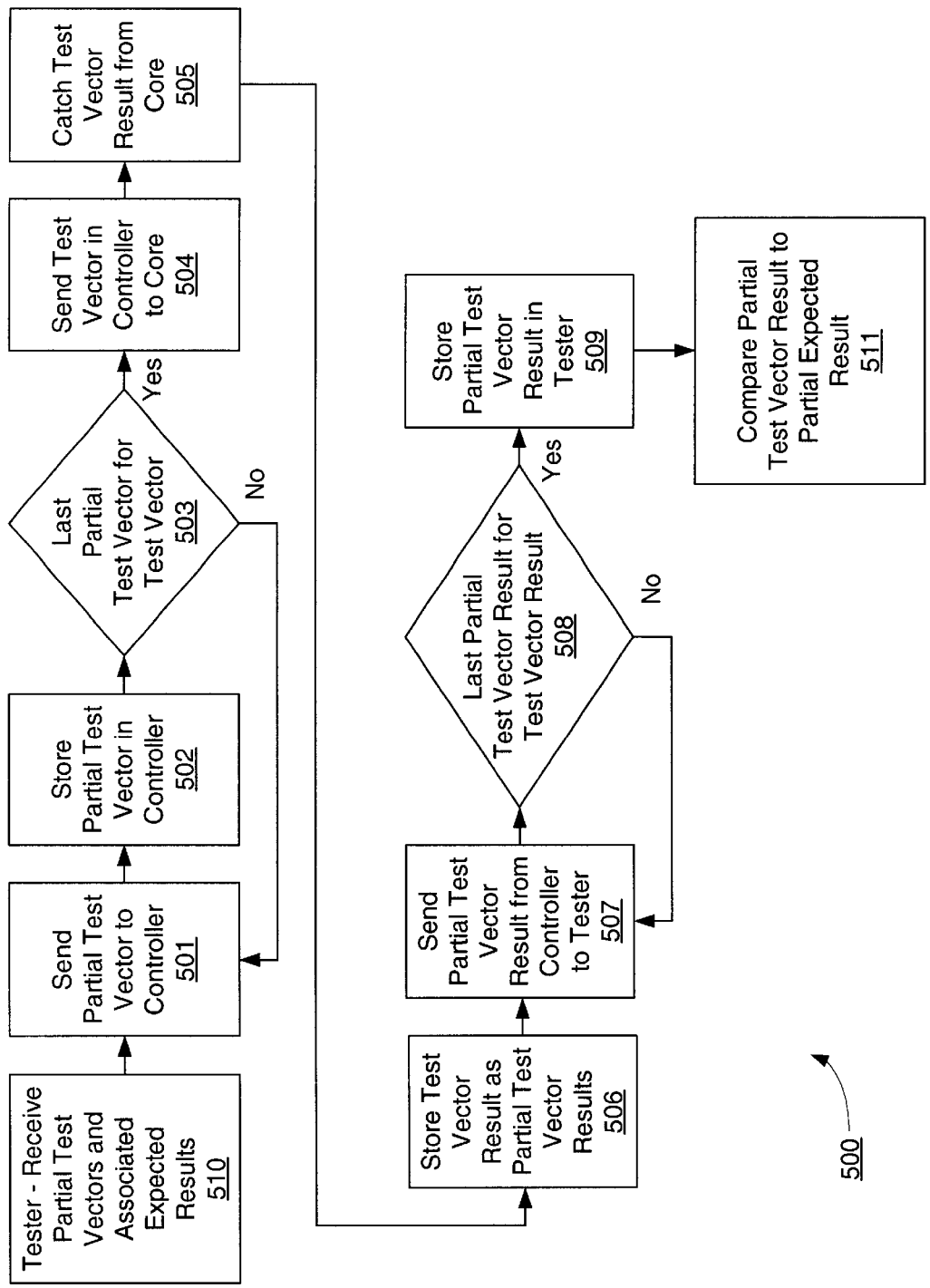
FIG. 5 is a flow diagram of an exemplary embodiment of a test process in accordance with one or more aspects of the present invention.

Referring to FIG. 4, there is shown a timing diagram of portions of exemplary embodiments of input and output signals 400 of vector controller 129 in accordance with one or more aspects of the present invention. Referring to FIG. 5, there is shown a flow diagram of an exemplary embodiment of a test process 500 in accordance with one or more aspects of the present invention. With reference to FIGS. 1 through 5, operations of vector controller 129 and tester 202 are described.

At step 510, partial test vectors and associated partial expected results are provided to tester 202. Partial test vectors may be provided using a computer program that reads a line from a test vector file, then reads out a determined number of digits to a first line in an output file, reads-out the determined number of digits to a second line in an output file, and so on until a last line of such a test vector file has been read out. Notably, the determined number in the above example is constant. For a test vector file that is not evenly divisible, dummy values may be inserted. Notably, original expected results may be formed into partial expect results the same way partial test vectors are split from original test vector input.

At step 501, a partial test vector is sent from tester 202 to vector controller 129 via signal inputs 102 of integrated circuit chip 100. In FIG. 4, this is indicated by a transition of new_vector signal 403. Notably, there may be more than one test vector, thus each pulse of new_vector signal 403 indicates the beginning of a new original test vector, which is not necessarily the beginning of a partial test vector. To avoid confusion between partial test vectors and a test vector from which they originate, test vector shall hereafter be referred to as an "original test vector."

Input_clock signal 401 may be used to clock in each partial test vector from data_in signal 405 into registers 525 forming a portion of vector controller 129. A register may be used to count each such partial test vector inputted to indicate when all partial test vectors for an original test vector have been inputted to controller 129. Though registers are described herein, it should be understood that other well-known storage circuits may be used, the availability of which may depend on the non-embedded device.

Clocking partial test vectors into vector controller 129 is represented in FIG. 5 as sending partial test vector to vector controller 129 at step 501, storing a partial test vector at step 502 and checking for a last or another partial test vector for a test vector at step 503.

Once all partial test vectors associated with a complete line of an original test vector have been provided to vector controller 129, vector controller 129 provides them as an input test vector to embedded core 110 at step 504. In FIG. 4, controller 129 generates output_clock signal 407 for clocking such an input test vector on output-to_core signal 406 to embedded core 110.

In response to receiving an input test vector, embedded core 110 provides a test vector result to vector controller 129 at step 505. Vector controller 129 is configured to know when valid data may be caught from signal input lines 112 from output signals on pins 114-B. In FIG. 4, a test vector result on data signal input_from_core 408 is clocked into controller 129.

This test vector result is disassembled and stored as partial test vector results at step 506 in vector controller 129. A test vector result may be stored in the same or different registers used for storing partial test vectors, or in some other well-known storage device. Though such a test vector result is divided into partial vector results for output in sections or blocks, it may be stored as a test vector result and output serially. However, for taking out a test vector result longer or wider than output pins 104-B at step 507, such a test vector result is divided into blocks of lengths no greater than that of output pins 104-B. Again, this may require adding dummy bits to fill unused space or such partial test vector results may have different lengths or some combination thereof.

In FIG. 5, partial test vector results or data on data_out signal 409 is provided to tester 202 from vector controller 129 in response to data_ready signal 404. Moreover, a register or other well-known storage device in vector controller 129 may be used to count that all partial test vector results have been outputted as clocked out by input_clock signal 401 for resetting data ready signal 404. In FIG. 5, this is indicated at step 508 by checking that all partial test vector results have been sent to tester 202.

Referring to FIG. 5, at step 509, due to limited output pins from integrated circuit 100, each comparison is output as a partial status or outcome that tester 202 stores after receipt. At step 511, each partial test vector result is compared with an associated expected partial test vector result provided at step 510. By immediately comparing each partial result with its associated expected result, tester 202 is able to arrive at an overall result in a shorter period of time as compared to assembling all such information first. Alternatively, tester 202 could wait for all partial status or outcomes to be received prior to comparing an entire expect result for a test vector input.

Figure 6:
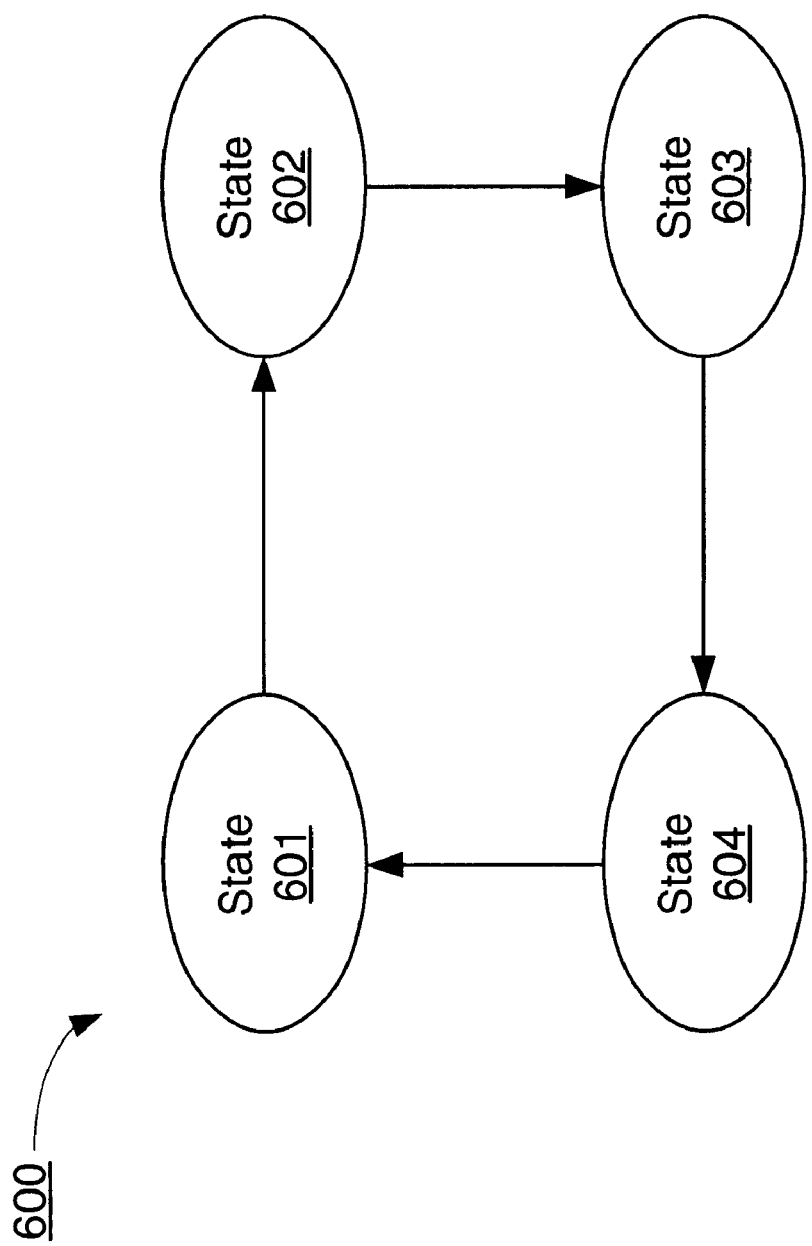
FIG. 6 is a state diagram of an exemplary embodiment of a state machine in accordance with one or more aspects of the present invention.

Referring to FIG. 6, there is shown a state diagram of an exemplary embodiment of a state machine 600 in accordance with one or more aspects of the present invention. State machine 600 may be instantiated in vector controller 129 of FIG. 1, where states 601 through 604 indicate states of as shown in Table I.

TABLE I

| Reference No. | State | Description of State |
| --- | --- | --- |
| 601 | 00 | Idle |
| 602 | 01 | Receiving Partial Vector |
| 603 | 10 | Wait State |
| 604 | 11 | Catch, Disassemble, Output |

With reference to FIGS. 1, 2, 4 and 6, at state 601, state machine 600 is in an idle state. In an idle state, state machine 600 waits for a an indication of data is going to be input to-vector controller 129 from tester 202, namely, vector controller 129 waits for new_vector signal 403 to go active. In response to a new_vector signal 403 going active, state machine 600 enters into state 602. State 602 is a receiving partial test vector state. This is a data input state, where data is supplied via data_in signal 405. Though data is provided in parallel via multiple input pins of input pins 104-A of integrated circuit 100, each partial test vector is supplied serially. Accordingly, state machine stays in state 602 until all partial test vectors for an original test vector have been inputted into vector controller 129, as determined by a counter internal to vector controller 129. Once all such partial test vectors have been inputted, assembled and provided to embedded core 110, state machine goes into a wait state at state 603. Wait state 603 provides time for embedded core 110 to respond to a received test vector from vector controller 129. State machine 600 goes into state 604 when embedded core 110 vector output result is caught by vector controller 129. In state 604, such vector output result is divided into partial vector output results and output to pins of output pins 104-B of integrated circuit 100.

While foregoing is directed to the preferred embodiment of the present invention, other and further embodiments of the invention may be devised without departing from the basic scope thereof, and the scope thereof is determined by the claims that follow. For example, though the present invention is described in terms of an FPGA and embedded processor core, it should be understood that constructs other than an FPGA and an embedded processor core may be used, including, but not limited to, combinations formed of a programmable logic device and at least one of a memory, an Application Specific Integrated Circuit, an Application Specific Standard Product, a Digital Signal Processor, a microprocessor, a microcontroller, and the like. Moreover, though an example of 400% more pins was used, it should be apparent that an embedded device may have a greater or lesser percentage of pins or terminals for interconnectivity than 400%. Furthermore, use of the present invention should be considered even when then number of pins in the embedded device is in a range of approximately 5 to 25 percent greater than the number of pins on the integrated circuit.

All trademarks are the respective property of their owners.

What is claimed is:

1. A method for testing an embedded device in an integrated circuit, the integrated circuit having a first plurality of pins, the embedded device having a second plurality of pins, the second plurality of pins greater than the first plurality of pins, the method comprising:
   programming a portion of the integrated circuit, not the embedded device, as a vector controller;
   obtaining a test vector;
   dividing the test vector into partial test vectors;
   separately sending each of the partial test vectors to the vector controller;
   assembling the partial test vectors as the test vector; and
   sending the test vector from the vector controller to the embedded device.

2. The method of claim 1 further comprising:
   providing a test vector result in response to receiving the test vector;
   dividing the test vector result into partial test vector results; and
   separately sending each of the partial test vector results from the integrated circuit to a tester.

3. The method of claim 2 further comprising storing the partial test vectors in registers in the vector controller.

4. The method of claim 2 further comprising storing the partial test vector results in registers in the vector controller.

5. The method of claim 4 wherein the integrated circuit comprises a programmable logic device having the embedded device.

6. A system for testing, comprising:
   a tester;
   an integrated circuit to be tested coupled to the tester; and
   the integrated circuit comprising a programmable logic device and an embedded device, the embedded device having more input pins than the integrated circuit, the programmable logic device programmed to receive portions of a test vector and assemble the portions of the test vector to test the embedded device.

7. The system of claim 6 wherein the programmable logic device comprises registers for storing the portions of the test vector.

8. A system for testing comprising:
   a tester;
   an integrated circuit to be tested coupled to the tester;
   the integrated circuit comprising a programmable logic device and an embedded device, the embedded device having more input and output pins than the integrated circuit, the programmable logic device programmed to receive portions of a test vector from the tester, assemble the portions of the test vector to test the embedded device, receive a test vector result from the embedded device, disassemble the test vector result into test vector result portions, and output the test vector result portions to the tester.

9. The system of claim 8 wherein the programmable logic device comprises registers for storing the portions of the test vector.

10. A method of providing testing capability for an integrated circuit having fewer pins than an embedded device in the integrated circuit, the method comprising:
   providing a programmable logic device coupled to the embedded device, the programmable logic device forming a portion of the integrated circuit; and
   programming the programmable logic device to function as a vector controller, the vector controller configured to obtain portions of a test vector, to assemble the portions into the test vector, to provide the test vector as assembled to the embedded device, to obtain a test vector result in response to the test vector as assembled, to disassemble the test vector result into test vector result portions and to output the test vector result portions.

11. The method of claim 10 wherein the programming step comprises:
   initializing inputs and outputs of the vector controller; and
   defining data width of at least a portion of the inputs and outputs of the vector controller.

12. The method of claim 11 wherein the programming step comprises:
   defining a first set of registers for storing the portions of the test vector; and
   defining a first set of operations for the vector controller to process the portions of the test vector.

13. The method of claim 12 wherein the programming step comprises:
   defining a second set of registers for storing the test vector result portions; and
   defining a second set of operations for the vector controller to process the test vector result portions.

14. The method of claim 13 wherein the programming step comprises instantiating a state machine as part of the vector controller.

15. An integrated circuit apparatus for providing testing capability for an embedded device in a programmable logic device where the embedded device has more input and output pins than the programmable logic device, the apparatus comprising:

at least a portion of the programmable logic device configured to function as a vector controller, the vector controller configured to receive test vector portions, assemble the test vector portions to provide a test vector input to the embedded device, obtain a test vector result from the embedded device in response to the test vector input, and output the test vector result.

16. The integrated circuit apparatus of claim 15 wherein the test vector result is output in sections.

17. The integrated circuit apparatus of claim 16 wherein the test vector portions are clocked into the vector controller in response to a new vector signal.

18. The integrated circuit apparatus of claim 17 wherein the sections of the test vector result are clocked out of the vector controller in response to a data ready signal.

19. The integrated circuit apparatus of claim 18 wherein the programmable logic device is a field programmable gate array.

20. The integrated circuit apparatus of claim 19 wherein the embedded device is a microprocessor core.

* * * * *